(No Model.)
C. J. HERRBERG.
LUBRICATOR FOR DRILLING MACHINES.
No. 373,830. Patented Nov. 29, 1887.
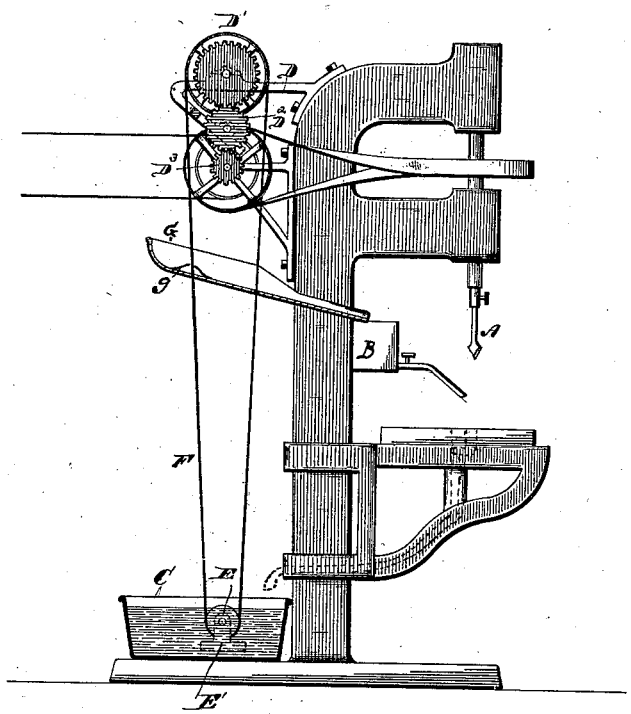
WITNESSES
INVENTOR
Attorney

UNITED STATES PATENT OFFICE.

CHARLES J. HERRBERG, OF COLUMBUS, OHIO, ASSIGNOR TO THE NEWARK MACHINE COMPANY, OF SAME PLACE.

LUBRICATOR FOR DRILLING-MACHINES.

SPECIFICATION forming part of Letters Patent No. 373,830, dated November 29, 1887.

Application filed July 5, 1887. Serial No. 243,467. (No model.)

*To all whom it may concern:*

Be it known that I, CHARLES J. HERRBERG, residing at Columbus, county of Franklin, State of Ohio, have invented a new and useful Improvement in Lubricators for Drilling-Machines; and I declare the following to be a full, clear, and exact description of the same, such as will enable others skilled in the art to which it pertains to make and use it, reference being had to the accompanying drawing, which forms a part of this specification.

In the drawing the figure is a view, in side elevation, illustrating my invention.

It is the purpose of this invention to provide a means for automatically elevating to a drill, boring-machine, or other tool requiring lubrication the water or oil with which the lubrication is accomplished.

In carrying out my invention, A represents any tool requiring lubrication.

B is an upper tank at the proper level from which to feed the water or lubricant to the tool.

C is a lower tank into which the water or oil that has dripped from the tool is gathered to be again used, although, if desired, this lower tank may not receive the drip from the tool, but be provided with a sufficient quantity of clear water or oil.

D is a bracket or support carrying a sheave-wheel, D'. Motion is communicated to this wheel in any convenient way from some adjacent moving part of the machinery—as, for instance, in the particular case shown in the drawings, by the intermediate gear-wheels, $D^2$ and $D^3$.

E is another sheave-wheel, attached, preferably, to a weight, E', in the lower tank, so that the weight may at all times serve to hold the belt F taut.

G is a funnel through which the belt passes. This funnel directs the water or other lubricant into the upper tank.

The operation will now be understood. When the machine to which the elevator is attached is in motion, the elevator mechanism is likewise set into operation. The belt is caused to move rapidly through the water or other lubricant in the lower tank and will continually drag a quantity along adhering to the belt. As the belt passes through the funnel G, this is scraped off and flows through the funnel into the upper tank. To facilitate discharging into the funnel, I prefer to locate in the funnel a piece, g, of cloth or rubber or leather, &c., which is caused to rub against the belt and so scrape off the water or oil. The quantity required can be regulated by giving a greater or less speed to the belt; or it may be regulated without altering the speed, by simply using a larger or a smaller belt.

I do not confine myself to the exact construction and arrangement of parts shown, as the same may be varied within the scope of the invention. Other forms of gearing or driving mechanism than that shown may be employed, as circumstances may require, and the lubricator may be used for other purposes than supplying tools.

What I claim is—

1. An apparatus for elevating water or other lubricant to the part to be lubricated, consisting of a belt arranged to travel through the lubricant, a funnel through which the belt passes, and a scraper in said funnel and against which the belt moves, substantially as described.

2. In an apparatus for elevating water or other lubricant to the part to be lubricated, the combination of the upper and lower tanks, the belt, a weighted pulley for the belt contained in the lower tank, and means, substantially as described, for conveying the lubricant from the belt to the upper tank, as set forth.

3. The combination of the tanks B C, the belt, the weighted pulley E in the tank C, the funnel G, leading to the tank B, and the scraper g, contained in said funnel, substantially as described.

In witness whereof I sign this specification in the presence of two witnesses.

CHARLES J. HERRBERG.

Witnesses:
RICHD. T. CLARKE,
E. B. APPLEMAN.